United States Patent
Fernandez et al.

(10) Patent No.: US 9,390,744 B2
(45) Date of Patent: Jul. 12, 2016

(54) POLYCARBONATE COMPOSITION TO PRODUCE OPTICAL QUALITY PRODUCTS WITH HIGH QUALITY AND GOOD PROCESSABILITY

(71) Applicant: SABIC GLOBAL TECHNOLOGIES B.V., Bergen op Zoom (NL)

(72) Inventors: Ignacio Vic Fernandez, Murcia (ES); David Del Agua Hernandez, Cartagena (ES); Cornelis Jan Maria Rijken, Bergen op Zoom (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 307 days.

(21) Appl. No.: 14/039,604

(22) Filed: Sep. 27, 2013

(65) Prior Publication Data

US 2014/0093673 A1 Apr. 3, 2014

(30) Foreign Application Priority Data

Sep. 28, 2012 (EP) .................................... 12382375

(51) Int. Cl.
*G11B 7/2534* (2013.01)
*C08K 5/103* (2006.01)
*G11B 7/253* (2013.01)

(52) U.S. Cl.
CPC .............. *G11B 7/2534* (2013.01); *C08K 5/103* (2013.01); *C08K 2201/014* (2013.01); *C08K 2201/017* (2013.01); *G11B 2007/25304* (2013.01)

(58) Field of Classification Search
CPC .................. C08L 69/00; Y10T 428/21; Y10T 428/31507
See application file for complete search history.

(56) References Cited

U.S. PATENT DOCUMENTS

| 4,460,752 A | 7/1984 | Neuray et al. |
| 4,904,717 A | 2/1990 | Ho et al. |
| 5,973,102 A | 10/1999 | McCloskey et al. |
| 6,008,280 A | 12/1999 | Krishnan et al. |
| 6,359,042 B1 | 3/2002 | Anders et al. |

(Continued)

FOREIGN PATENT DOCUMENTS

| CN | 102443256 A | 5/2012 |
| EP | 0732360 A1 | 9/1996 |

(Continued)

OTHER PUBLICATIONS

European Search Report for European Application No. 14382081.9; Date of Completion: May 19, 2014; 5 pages.

(Continued)

*Primary Examiner* — Gerard Higgins
(74) *Attorney, Agent, or Firm* — Cantor Colburn LLP (57) ABSTRACT

The present disclosure relates to thermoplastic compositions, methods of making thermoplastic compositions, and articles made from thermoplastic compositions. The disclosed compositions comprise a polycarbonate polymer, a triacylglyceride release agent, and a monoacylglyceride release agent. In an embodiment, the thermoplastic composition comprises: greater than 90 weight percent based on the total weight of the composition of a melt polycarbonate polymer; a triacylglyceride release agent; and a monoacylglyceride release agent. The total amount of triacylglyceride release agent and the monoacylglyceride release agent is 0.01 to 0.5 weight percent based on the total weight of the composition.

13 Claims, 5 Drawing Sheets

(56) References Cited

U.S. PATENT DOCUMENTS

| | | |
|---|---|---|
| 6,555,646 B2 | 4/2003 | Volkers et al. |
| 6,921,784 B2 | 7/2005 | Dohi et al. |
| 7,084,233 B2 | 8/2006 | Miyamoto et al. |
| 7,307,114 B2 | 12/2007 | Hachiya et al. |
| 7,498,401 B2 | 3/2009 | Agarwal |
| 7,786,246 B2 | 8/2010 | Jansen et al. |
| 7,999,041 B2 | 8/2011 | Goossens et al. |
| 8,133,564 B2 | 3/2012 | Kitayama |
| 8,158,747 B2 | 4/2012 | Tanabe et al. |
| 2004/0225047 A1 | 11/2004 | Hachiya et al. |
| 2005/0215750 A1 | 9/2005 | Koga et al. |
| 2007/0191518 A1 | 8/2007 | Chen et al. |
| 2011/0128494 A1 | 6/2011 | Takahashi et al. |
| 2012/0095139 A1 | 4/2012 | Yoshida et al. |
| 2014/0093673 A1 | 4/2014 | Fernandez et al. |
| 2014/0094545 A1 | 4/2014 | Roncaglia et al. |
| 2014/0094550 A1 | 4/2014 | Diaz et al. |
| 2014/0234629 A1 | 8/2014 | Sun et al. |
| 2014/0378591 A1 | 12/2014 | Fernandez et al. |

FOREIGN PATENT DOCUMENTS

| | | |
|---|---|---|
| EP | 1529632 A1 | 5/2005 |
| EP | 1268606 B1 | 8/2006 |
| EP | 2287655 A1 | 2/2011 |
| EP | 2423262 A1 | 2/2012 |
| JP | S6081245 A | 5/1985 |
| JP | 20001439361 A | 5/2000 |
| JP | 2001226477 A | 8/2001 |
| JP | 2014118415 A | 6/2014 |
| JP | 2014118416 A | 6/2014 |
| JP | 2005068375 A | 3/2015 |
| WO | 0015707 | 3/2000 |
| WO | 0073386 A1 | 12/2000 |
| WO | 2012141336 A1 | 10/2012 |
| WO | 2014049575 A2 | 4/2014 |

OTHER PUBLICATIONS

U.S. Appl. No. 14/039,388, filed Sep. 27, 2013.
U.S. Appl. No. 14/039,492, filed Sep. 27, 2013.
International Search Report for International Application No. PCT/IB2013/058952; International Filing Date Sep. 27, 2013; Date of Mailing Jan. 30, 2014; 5 pages.
Written Opinion of the International Search Report for International Application No. PCT/IB2013/058952; International Filing Date Sep. 27, 2013; Date of Mailing Jan. 30, 2014; 5 pages.
Extended European Search Report for European Application No. 12382376.7; Date of Completion: Dec. 17, 2012; 6 pages.
Machine Translation of JP4290472 B2; Date of Issue Jul. 8, 2009; 28 pages.
European Patent Office Search Report; Application No. 12382375.9-1301;Date of Search Feb. 15, 2013; Application Date Feb. 27, 2013.
CN 102443256 A; Machine Translation; Date of Publication Feb. 9, 2012; 26 pages.
JP 2000143961 A; Machine Translation; Date of Publication May 26, 2000; 20 pages.

POLYCARBONATE COMPOSITION TO PRODUCE OPTICAL QUALITY PRODUCTS WITH HIGH QUALITY AND GOOD PROCESSABILITY

CROSS-REFERENCE TO RELATED APPLICATION

This application claims the benefit of EP Patent Application Serial No. 12382375.9 filed Sep. 28, 2012. The related application is incorporated herein by reference.

BACKGROUND

Polycarbonates are useful in a wide variety of applications in view of its good balance of properties, such as practical impact resistance, glass-like transparency, and moldability. In injection molding applications, effective mold release is a key property to enable efficient processing into formed articles. As such, a lower release force during the demolding of the parts is desirable. The lower release force can be achieved by adding a mold release agent to the thermoplastic composition. The release agent also helps to provide consistent processability.

Several materials, like polyesters, have the desired release performance. However, these materials have inferior mechanical properties, such as impact performance, compared to polycarbonate polymers. Further, these materials are difficult to process, as they have limited thermoformability for sheet applications and/or inadequate melt flow for injection molded parts.

An appropriate mold release not only facilitates processing, but should also be stable and inert during processing in such a way that it will not react with the polymer and other components, as well as preventing discoloring in time due to degradation. An appropriate mold release agent should not form deposits on the surface of the mold during injection molding nor on the roll calendar during extrusion processes and, therefore, become visible on the surface of the part causing aesthetic defects. Also, the additive should maintain transparency when required.

Conventional mold release agents, such as pentaerythrityl tetrastearate (PETS), provide acceptable release behavior in some applications. However, the release behavior is often not sufficient for relatively large parts or difficult profiles. The inadequate release behavior results in irregular processing or high release forces, possibly resulting in distortion of the ejected parts.

Customers of polycarbonate compositions, especially for media storage applications (compact disc (CD), digital versatile disc (DVD), Blu-ray Disc (BD)), desire enhanced processability of this material.

First, customers desire enhanced processability when different types of deposits are on the disc stamper. Customers desire improvements regarding these different deposits. Deposit improvements lead to an enhanced disc surface and an increased yield. The increased yield can be due to a decrease in the number of times needed to stop the production line for cleaning.

Second, customers desire enhanced processability regarding the static charge on the coating that is generated when demolding the disc. The improved coating may improve the production of a finished disc in the re-writeable format. The improved coating may also increase the yield and decrease costs.

Accordingly, there remains a need for thermoplastic compositions that have an enhanced coating and a higher yield. The enhanced coating and higher yield can result from a reduction in deposits and improved static charge behavior. This and other needs are satisfied by the various aspects of the present disclosure.

SUMMARY

This disclosure relates generally to thermoplastic compositions, and, specifically, to a thermoplastic composition comprising a polycarbonate polymer, a triacylglyceride release agent, and a monoacylglyceride release agent.

In an embodiment, a thermoplastic composition comprises: greater than 90 weight percent based on the total weight of the composition of a melt polycarbonate polymer; a triacylglyceride release agent; and a monoacylglyceride release agent. The total amount of triacylglyceride release agent and the monoacylglyceride release agent is 0.01 to 0.5 weight percent based on the total weight of the composition.

The above described and other features are exemplified by the following figures and detailed description.

BRIEF DESCRIPTION OF THE DRAWINGS

The accompanying drawings, which are incorporated in and constitute a part of this specification, illustrate exemplary aspects and together with the description, serve to explain the principles of the compositions, methods and systems disclosed herein.

DETAILED DESCRIPTION

The present disclosure can be understood more readily by reference to the following detailed description, examples, drawings, and claims, and their previous and following description. However, before the present compositions, articles, devices, systems, and/or methods are disclosed and described, it is to be understood that this disclosure is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the disclosure is also provided as an enabling teaching of the disclosure in its best, currently known aspect. To this end, those of ordinary skill in the relevant art will recognize and appreciate that changes and modifications can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those of ordinary skill in the relevant art will recognize that many modifications and adaptations to the present disclosure are possible and can even be desirable in certain circumstances and are thus also a part of the present disclosure. Thus, the following description is provided as illustrative of the principles of the present disclosure and not in limitation thereof.

Various combinations of elements of this disclosure are encompassed by this disclosure, e.g. combinations of elements from dependent claims that depend upon the same independent claim.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of fillers.

Reference throughout the specification to "one embodiment", "another embodiment", "an embodiment", and so forth, as well as to "an aspect", "another aspect", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance can or can not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required can vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are the components to be used to prepare disclosed compositions of the disclosure as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8 weight percent (wt %), it is understood that this percentage is in relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing one to six carbon atoms.

The term "alkenyl group" as used herein is a hydrocarbon group of 2 to 24 carbon atoms and structural formula containing at least one carbon-carbon double bond. Asymmetric structures such as (AB)C=C(CD) are intended to include both the E and Z isomers. This can be presumed in the structural formulae herein wherein an asymmetric alkene is present, or it can be explicitly indicated by the bond The term "carbonyl group" as used herein is represented by the formula C=O.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards. Gel permeation chromatography can be carried out using a crosslinked styrene-divinyl benzene column, at a sample concentration of 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

The terms "polycarbonate" or "polycarbonates" as used herein includes, without limitation, copolycarbonates, homopolycarbonates and (co)polyester carbonates.

The terms "residues" and "structural units", used in reference to the constituents of the polymers, are synonymous throughout the specification.

Each of the component materials disclosed herein for use in the manufacture of the disclosed thermoplastic compositions are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Composition

The present disclosure relates generally to thermoplastic compositions, and, more particularly, to a thermoplastic composition comprising a release agent. To that end, according to the aspects of the disclosure, a thermoplastic composition is disclosed that generally comprises a polycarbonate, a triacylglyceride release agent, and a monoacylglyceride release agent.

In one aspect, the thermoplastic composition comprises:
 a. a polycarbonate polymer;
 b. a glycerol tristearate release agent; and
 c. a glycerol monostearate release agent.

Polycarbonate

The thermoplastic composition comprises a first component of a polycarbonate polymer.

As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In various aspects, the polycarbonate can comprise copolymers comprising two or more distinct carbonate units. For example, a polycarbonate copolymer can comprise repeating carbonate units derived from 1,1-bis(4-hydroxyphenyl)methylphenylmethane (BisAP) and a second, chemically distinct dihydroxy monomer such as a bisphenol, e.g. bisphenol A. Alternatively, a polycarbonate copolymer can comprise repeating carbonate units derived from 2-phenyl-3,3-bis(4-hydroxyphenyl)phthalimidine (also known as N-phenyl phenolphthalein bisphenol, 3,3-bis(4-hydroxyphenyl)-2-phenylisoindolin-1-one), or "PPPBP") and a second, chemically distinct dihydroxy monomer such as a bisphenol, e.g. bisphenol A (BPA). In another aspect, the polycarbonate polymer comprises a polycarbonate copolymer formed from monomers comprising BPA and comprising dimethylbisphenol cyclohexanone (DMBPC), at least one isosorbide, or at least one aliphatic diol. In a further aspect, the polycarbonate copolymer comprises at least one acid monomer comprising sebacic acid, palimitic acid, or stearic acid. In an even further aspect, the polycarbonate polymer comprises a polycarbonate copolymer formed from monomers comprising BPA and acids comprising sebacic acid, palimitic acid, or stearic acid.

The polycarbonate can be derived from a bisphenol A monomer. The polycarbonate can be derived from a blend of at least two monomers with at least one of the monomers being bisphenol A.

The polycarbonate-based resin is selected from a polycarbonate or a resin blend that includes a polycarbonate. Accordingly, in one aspect, polycarbonate is used as the base resin in the composition. Polycarbonates including aromatic carbonate chain units include compositions having structural units of the formula (I):

(I)

in which the $R^1$ groups are aromatic, aliphatic or alicyclic radicals. $R^1$ can be an aromatic organic radical and, in an alternative aspect, a radical of the formula (II):

$$A^1-Y^1-A^2-$$ (II)

wherein each of $A^1$ and $A^2$ is a monocyclic divalent aryl radical and $Y^1$ is a bridging radical having zero, one, or two atoms which separate $A^1$ from $A^2$. In an exemplary aspect, one atom separates $A^1$ from $A^2$. Illustrative examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another aspect, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Examples of the types of bisphenol compounds that can be represented by formula (IV) include the bis(hydroxyaryl) alkane series such as, 1,1-bis(4-hydroxyphenyl)methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, or the like; bis (hydroxyaryl)cycloalkane series such as, 1,1-bis(4-hydroxyphenyl)cyclopentane, 1,1-bis(4-hydroxyphenyl) cyclohexane, or the like, or combinations including at least one of the foregoing bisphenol compounds.

Other bisphenol compounds that can be represented by formula (III) include those where X is —O, S, SO or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations including at least one of the foregoing bisphenol compounds.

Other bisphenol compounds that can be utilized in the polycondensation of polycarbonate are represented by the formula (V)

(V)

wherein, $R^f$, is a halogen atom of a hydrocarbon group having 1 to 10 carbon atoms or a halogen substituted hydrocarbon group; n is a value 0 to 4. When n is at least 2, $R^f$ is the same or different. Examples of bisphenol compounds that can be represented by the formula (IV), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations including at least one of the foregoing bisphenol compounds.

Bisphenol compounds such as 2,2,2',2'-tetrahydro-3,3,3', 3'-tetramethyl-1,1'-spirobi-[IH-indene]-6,6'-diol represented by the following formula (VI) can also be used.

(VI)

In one aspect, the bisphenol compound is bisphenol A.

Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is selected for use. The aliphatic diacids can have 2 to 40 carbons, for example, dodecanedioic acid.

Branched polycarbonates, as well as blends of linear polycarbonate and a branched polycarbonate can also be used in the composition. The branched polycarbonates can be prepared by adding a branching agent during polymerization. These branching agents can include polyfunctional organic compounds containing at least three functional groups, which can be hydroxyl, carboxyl, carboxylic anhydride, haloformyl, and combinations including at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations including at least one of the foregoing branching agents. The branching agents can be added at a level of 0.05 to 2.0 wt %, based upon the total weight of the polycarbonate in a given layer.

In one aspect, the polycarbonate can be produced by a melt polycondensation reaction between a dihydroxy compound and a carbonic acid diester. Examples of the carbonic acid diesters that can be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, bis (methylsalicyl)carbonate, diethyl carbonate, dimethyl carbonate, dibutyl carbonate, dicyclohexyl carbonate, or the like, or combinations including at least one of the foregoing carbonic acid diesters. In one aspect, the carbonic acid diester is diphenyl carbonate or bis(methylsalicyl)carbonate.

In one aspect, the polycarbonate is a melt polycarbonate. In another aspect, the polycarbonate is an interfacial polycarbonate. In a further aspect, the melt polycarbonate is made by a melt polymerization process. In an even further aspect, the interfacial polycarbonate is made by an interfacial polymerization process.

The number average molecular weight of the polycarbonate can be 3,000 to 1,000,000 grams/mole (g/mole). Within this range, the number average molecular weight can be greater than or equal to 10,000 in one aspect, greater than or equal to 20,000 in another aspect, and greater than or equal to 25,000 g/mole in yet another aspect. The number average molecular weight can be less than or equal to 100,000 in one aspect, less than or equal to 75,000 in an alternative aspect, less than or equal to 50,000 in still another alternative aspect, and less than or equal to 35,000 g/mole in yet another alternative aspect.

In one aspect, the polycarbonate can comprise different grades of polycarbonates. The at least one polycarbonate can have different additional functional groups which can or cannot be incorporated into the polymer. For example, the at least one polycarbonate can be selected from PC 105 or PC 175, both commercially available from SABIC's Innovative Plastics business. Further, the at least one polycarbonate can be a high viscosity polycarbonate, for example, the high viscosity polycarbonate can have a Melt Volume Rate (MVR) of less than or equal to 10 grams per 10 minutes (g/10 min), specifically, less than or equal to 6 g/10 min measured at 300 degrees Celsius (° C.)/1.2 kilogram (kg). Non-limiting examples of additional functional groups can include aromatic groups, phenyl groups, for example, bisphenol A (BPA), alkyl groups, halogen groups, or amide groups.

The at least one polycarbonate can, for example, be made by a melt process with an MVR of 2 g/10 min to 250 g/10 min at 300° C./1.2 kg. For example, the MVR can be 23.5 g/10 min to 28.5 g/10 min. In one aspect, the MVR can be 40 g/10 min to 70 g/10 min at 300° C./1.2 kg. In another aspect, the melt flow rate (MFR) can be 2 g/10 min to 250 g/10 min at 300° C./1.2 kg. In a further aspect, the MFR can be 40 g/10 min to 70 g/10 min at 300° C./1.2 kg.

The at least one polycarbonate can, for example, be made by a melt process and can have an endcap level [ratio of phenol endgroups to total endgroup amount in % (OH+Phenol)] higher than 50%, specifically, greater than 80%, more specifically, 80 to less than 100%, more specifically, 80 to 95%.

The polycarbonate can be a melt polycarbonate as melt polycarbonate inherently has a negative static charge as compared to interfacial polycarbonate that inherently has a positive static charge. The incorporation of the present release agent in a melt polycarbonate can increase the average static charge to a value closer to neutral, i.e. zero.

In one aspect, the polydispersity index (PDI) of the polycarbonate can be 1.9 to 2.6. In another aspect, the PDI of the polycarbonate can be 1.9 to 2.3.

In one aspect, the polycarbonate has branching from the structures below of less than 6,000 parts per million by weight (ppm), specifically, less than 2,000 ppm.

In another aspect, the polycarbonate has branching including the structures disclosed in U.S. Pat. No. 7,084,233, which is herein incorporated by this reference for its teaching of branching.

In one aspect, the number average molecular weight of the polycarbonate polymer is measured using a standard. In another aspect, the standard is polystyrene. As such, when reference is made to "polystyrene basis," this reference indicates the standard which is used.

In one aspect, the polycarbonate polymer comprises a polycarbonate polymer with a number average molecular weight of 15,000 to 150,000 Dalton (polystyrene basis). In a further aspect, the polycarbonate polymer can comprise a polycarbonate polymer with a number average molecular weight of 27,000 to 80,000 Dalton (polystyrene basis). In an even further aspect, the polycarbonate polymer is a BPA polycarbonate with a number average molecular weight of 27,000 to 80,000 Dalton (polystyrene basis). In another aspect, the polycarbonate copolymer can comprise BPA in combination with, for example, dimethylbisphenol cyclohexanone (DMBPC), Isosorbide, aliphatic diols or acids, for example, sebacic acid with a number average molecular weight of 27,000 to 80,000 Dalton (polystyrene basis).

In one aspect, the polycarbonate comprises at least 5 wt % relative to the thermoplastic composition's total weight percentage. In a further aspect, the composition comprises greater than or equal to 90 wt %, specifically, greater than or equal to 91 wt %, more specifically, greater than or equal to 95 wt %, still more specifically, greater than or equal to 99 wt % polycarbonate relative to the thermoplastic composition's total weight percentage. In another aspect, the total polycarbonate amount is 5 wt % to 99.7 wt %, relative to the thermoplastic composition's total weight percentage. In a further aspect, the total polycarbonate amount is 1 wt % to 99.7 wt % relative to the thermoplastic composition's total weight percentage. In an even further aspect, the total polycarbonate amount is 1 wt % to 99.92 wt % relative to the thermoplastic composition's total weight percentage. In a yet further aspect, the total polycarbonate amount is 1 wt % to 99.5 wt % relative to the thermoplastic composition's total weight percentage. In another aspect, the total polycarbonate amount is 1 wt % to 99.91 wt % relative to the thermoplastic composition's total weight percentage. In a further aspect, the total polycarbonate amount is 1 wt % to 99.47 wt % relative to the thermoplastic composition's total weight percentage.

Release Agent

The disclosed compositions also comprise a second component. The second component is a triacylglyceride release agent.

In one aspect, the composition comprises a release agent of formula (A)

wherein $R_1$, $R_2$, and $R_3$ can be the same or different hydrocarbon chains with 8 to 20 carbon atoms and 0 to 6 unsaturations.

In one aspect, $R_1$, $R_2$, and $R_3$ are independently selected from $C_8$-$C_{20}$ alkyl, $C_8$-$C_{20}$ haloalkyl, $C_8$-$C_{20}$ polyhaloalkyl, $C_8$-$C_{20}$ alkene, and $C_8$-$C_{20}$ alkoxy. In another aspect, $R_1$, $R_2$, and $R_3$ are independently selected from $C_{17}H_{35}$ and in another aspect are all $C_{17}H_{35}$.

In one aspect, the triacylglyceride release agent comprises glycerol tristearate (GTS). GTS is a solid at room temperature with a melting point of 72-75° C., which facilitates handling of the release agent. This fully esterified glycerol molecule does not contain free hydroxyl groups as glycerol monostearate (GMS), hence no degradation of the thermoplastic composition is promoted. A smaller molecule than PETS, GTS retains sufficient mobility to partially migrate to the surface of the molten providing better release than PETS, yet has a lower plate-out than GMS.

In one aspect, the triacylglyceride release agent is present in an amount of 0.01 weight percent to 1 weight percent relative to the total weight of the thermoplastic composition. In another aspect, the triacylglyceride release agent is present in an amount of 0.01 weight percent to 0.5 weight percent relative to the total weight of the thermoplastic composition. In another aspect, the triacylglyceride release agent is present in an amount of 0.01 to less than 0.5 weight percent, specifically, 0.01 to 0.4 weight percent ppm, more specifically, 0.01 to 0.35 weight percent relative to the total amount of the thermoplastic composition. The triacylglyceride release agent can be present in an amount of 0.005 to less than 0.5 weight percent, specifically, 0.005 to 0.4 weight percent. In a yet further aspect, the triacylglyceride release agent is present in an amount of 0.03 weight percent to 0.05 weight percent relative to the total weight of the thermoplastic composition.

In another aspect, the glycerol tristearate is present in an amount of 0.01 weight percent to 1 weight percent relative to the total weight of the thermoplastic composition. In a further aspect, the glycerol tristearate is present in an amount of 0.01 weight percent to 0.5 weight percent relative to the total weight of the thermoplastic composition. In another aspect, the glycerol tristearate is present in an amount of 0.01 to less than 0.5 weight percent, specifically, 0.01 to 0.4 weight percent ppm, more specifically, 0.01 to 0.35 weight percent relative to the total amount of the thermoplastic composition. In another aspect, the glycerol tristearate is present in an amount of 0.03 weight percent to 0.1 weight percent relative to the total weight of the thermoplastic composition. In a yet further aspect, the glycerol tristearate is present in an amount of 0.03 weight percent to 0.05 weight percent relative to the total weight of the thermoplastic composition.

Second Release Agent

In one aspect, the thermoplastic composition comprises a second release agent.

In one aspect, the second release agent comprises a monoacylglyceride release agent. In another aspect, the second release agent comprises glycerol monostearate.

In one aspect, the total amount of monoacylglyceride release agent is 0.01 weight percent to 0.5 weight percent relative to the total weight of the thermoplastic composition. In one aspect, the total amount of monoacylglyceride release agent is 0.01 to less than 0.5 weight percent, specifically, 0.01 to 0.4 weight percent ppm, more specifically, 0.01 to 0.35 weight percent relative to the total amount of the thermoplastic composition. The monoacylglyceride can be present in an amount of 0.005 to less than 0.5 weight percent, specifically, 0.005 to 0.4 weight percent. In another aspect, the total amount of monoacylglyceride release agent is 0.01 weight percent to 0.2 weight percent relative to the total weight of the thermoplastic composition.

In a further aspect, the triacylglyceride release agent is present in an amount of 0.01 weight percent to 1 weight percent relative to the total weight of the thermoplastic composition and the total amount of monoacylglyceride release agent is 0.01 weight percent to 0.5 weight percent relative to the total weight of the thermoplastic composition. In an even further aspect, the triacylglyceride release agent is present in an amount of 0.01 weight percent to 3 weight percent relative to the total weight of the thermoplastic composition and the total amount of monoacylglyceride release agent is 0.01 weight percent to 0.2 weight percent relative to the total weight of the thermoplastic composition.

The triacylglyceride release agent and the monoacylglyceride release agent can be present in an amount of 0.005 weight percent to 0.5 weight percent, specifically, 0.005 weight percent to 0.2 weight percent, more specifically, 0.01 weight percent to 0.1 weight percent relative to the total weight of the thermoplastic composition. The triacylglyceride release agent and the monoacylglyceride can each independently be present in an amount of 0.005 to less than 0.5 weight percent, specifically, 0.005 to 0.4 weight percent, more specifically, 0.01 to 0.35 weight percent relative to the total amount of the thermoplastic composition. In one aspect, the ratio of the monoglyceride release agent to the triacylglyceride release agent is 1:1 to 1:4, specifically, 1:1.5 to 1:3.5.

In one aspect, the triacylglyceride release agent and the monoacylglyceride release agent are the only two release agents in the thermoplastic composition. In another aspect, the glycerol tristearate and the glycerol monostearate are the only two release agents in the thermoplastic composition.

Other Additives

The disclosed compositions can further optionally comprise one or more additives conventionally used in the manufacture of polymer resin with the proviso that the additives do not adversely affect the desired properties of the resulting composition. Mixtures of additives can also be used. Such additives can be mixed at a suitable time during the mixing of the components for forming the composite mixture. For example, the disclosed compositions can comprise one or more fillers, stabilizers, catalyst quenchers, tints, flame-retardants, impact modifiers, colorants, and/or mold release agents. In one aspect, the composition further comprises one or more optional additives selected from an antioxidant, flame retardant, inorganic filler, catalyst quencher, tint, and stabilizer. In another aspect, the composition further comprises a second release agent, a heat stabilizer, a catalyst quencher, a tint, or a combination comprising at least one of the foregoing. The composition can be free of one or both of an antistatic agent and a flame retardant.

In one aspect, the thermoplastic composition further comprises additional release agent(s) (e.g., a third release agent) different from the triacylglyceride release agent and the monoacylglyceride release agent.

In one aspect, the thermoplastic composition comprises a third release agent selected from a fully polyol fatty acid ester; a polyol fatty acid partial ester; a saturated alpha olefin oligomer; and combinations comprising at least one of the foregoing.

In another aspect, the polyol fatty acid partial ester comprises an aliphatic polyol having 2 to 6 free hydroxyl moieties and a $C_{10}$-$C_{36}$ fatty acid ester moiety. In one aspect, the third release agent comprises polyalpha-olefin oligomer (PAO). In a further aspect, the thermoplastic composition comprises at least one third release agent selected from pentaerythritol tetrastearate; glycerol monostearate; and saturated poly(alpha) oligomer. In an even further aspect, the thermoplastic composition comprises at least two third release agents selected from pentaerythritol tetrastearate (PETS); glycerol monostearate (GMS); and saturated poly(1-decene) oligomer. In a yet further aspect, the thermoplastic composition comprises at least one third release agent comprising pentaerythritol tetrastearate; glycerol monostearate; and saturated poly(alpha) oligomer. In another aspect, the third release agent comprises linear low density polyethylene (LLDPE).

Any of the three previously discussed third release agents (PETS, PAO & GMS) can be combined to give improved release. The synergistic effect of the combined release agents can greatly improve the release performance.

In one aspect, the third release agent is present in an amount of 0.01 weight percent to 5 weight percent relative to the total weight of the thermoplastic composition. For example, the second release agent is present in an amount of 0.01 weight percent to 3 weight percent relative to the total weight of the thermoplastic composition.

In one aspect, the thermoplastic composition further comprises an ultraviolet (UV) stabilizer.

In another aspect, the UV stabilizer comprises 2-[2-hydroxy-3,5-di(1,1-dimethylbenzylphenyl)]-2H-benzotriazole; 2,2'-methylenebis(6-(2H-benzotriazol-2-yl)-4-(1,1,3,3-tetramethylbutyl)phenol); or pentaerythritol tetrakis(2-cyano-3,3-diphenylacrylate), or a combination comprising at least one of the foregoing. In a further aspect, the UV stabilizer comprises 2-benzotriazolyl-4-tert-octylphenol.

Suitable UV stabilizers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV stabilizers.

In one aspect, the UV stabilizer is present in an amount of 0.05 wt % to 10 wt % relative to the total weight of the thermoplastic composition. In another aspect, the UV stabilizer is present in an amount of 0.05 wt % to 0.5 wt % relative to the total weight of the thermoplastic composition. In a further aspect, the UV stabilizer is present in an amount of 0.05 wt % to 0.4 wt % relative to the total weight of the thermoplastic composition.

Heat stabilizers include, for example, organo phosphites such as triphenyl phosphite, tris-(2,6-dimethylphenyl)phosphite, tris(2,4-di-tert-butylphenyl) phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of 0.01 to 0.5 parts by weight based on 100 parts by weight of the total composition, excluding any filler. In one aspect, the heat stabilizer can be used in amounts of 0.0001 to 0.04 parts by weight based on 100 parts by weight of the total composition.

Antioxidants include, for example, organophosphites such as tris(nonyl phenyl)phosphite, tris(2,4-di-t-butylphenyl) phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of 0.01 to 0.5 parts by weight, based on 100 parts by weight of the total composition, excluding any filler.

Examples of catalyst quenchers include, for example, butyl tosylate, p-toluenesulphinic acid, phosphohoric acid, phosphorous acid, or sulfuric acid. The catalyst quencher can be present in an amount of less than or equal to 10 ppm, specifically, less than or equal to 2 ppm based on the total amount of the final composition.

Light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like, or combinations including at least one of the foregoing light stabilizers. Light stabilizers are generally used in amounts of 0.1 to 1.0 parts by weight, based on 100 parts by weight of the total composition, excluding any filler.

Plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of 0.5 to 3.0 parts by weight, based on 100 parts by weight of the total composition, excluding any filler.

Antistatic agents include, for example, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative. Likewise, the thermoplastic composition can be free of antistatic agents.

Lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers comprising at least one of the foregoing e.g., methyl stearate and polyethylene-polypropylene glycol copolymers in a suitable solvent; or combinations including at least one of the foregoing lubricants. Lubricants are generally used in amounts of 0.1 to 5 parts by weight, based on 100 parts by weight of the total composition, excluding any filler.

Blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of 1 to 20 parts by weight, based on 100 parts by weight of the total composition, excluding any filler.

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Properties

In the present disclosure, the disclosed thermoplastic composition can exhibit, for example, maintained or improved mechanical, thermal, and morphological properties. In one aspect, thermoplastic composition maintains good mechanical properties while maintaining relatively low material costs.

In the present disclosure, low discoloration due to degradation and low surface defects due to the volatility of the additives is desirable. In a further aspect, the thermoplastic composition shows the reduction of aesthetic defects on the surface of the molded part. Previously, during processing, volatile compounds migrate to the surface of the thermoplastic composition, forming a solid deposit on the mold surface. As such, undesired marks on the surface of the final item can occur. In one aspect, the thermoplastic composition utilizes less volatile compounds, shows less solid deposits on the surface, and displays fewer marks on the surface.

In one aspect, the composition does not exhibit detectable surface vibration during extrusion. The surface vibration test involves a visual inspection of the sheet surface to determine whether the sheet shows waviness. This waviness is caused by vibrations of the sheet coming out of the calibrator. The vibrations are caused by surface defects originating on the extruded thermoplastic composition's top surface, due to an excessive sticking between the thermoplastic composition and the extruder calibrator.

The release property can be shown using the friction coefficient because the friction coefficient influences the demolding properties of injection-molded parts. In most injection molding processes the demolding force has to overcome a maximum friction force due to sticking of the part in the mold cavity (static friction coefficient) and sliding of the part out of the cavity on a lower sliding friction coefficient. Therefore, release performance is measured as friction force vs. cycle time and reported as a coefficient of friction. The mold release performance was evaluated using an injection molding machine Arburg 370 with a screw diameter of 25 millimeter (mm) and injection velocity 40 mm/second (s). The friction coefficient during demolding was measured at 300° C./100° C. Melt/Mold temperature. The test standard is UL International TTC GmbH.

In one aspect, the friction coefficient of the thermoplastic composition is less than 0.58. In another aspect, the friction coefficient of the thermoplastic composition is 0.1 to 0.5, for example 0.25 to 0.5.

Plate-out is intended as the migration of a substance out of the polycarbonate bulk, during the processing, and as a consequence, deposits are formed on the surface of the extruded profile and/or die-head holes. In one aspect, the dry plate-out is 2.5 mg to 6.0 mg. In another aspect, the dry plate-out is 4.0 mg to 5.0 mg. Plate-out is determined by determining a stamper weight after 8000 shots, cleaning the stamper, and washing the deposit from the stamper surface. After cleaning, the stamper weight is again determined and the plate-out or the weight of the deposit is equal to the weight before cleaning minus the weight after cleaning. "Dry" plate-out is determined using a dry sample that contains less than or equal to 200 ppm of water.

In another aspect, the molded article exhibits a reduction in deposits than that exhibited by a molded article formed from an identical reference composition in the absence of the triacylglyceride release agent. In a further aspect, the reduction in deposits comprises a decreased plate-out.

The presence of static charge itself when significant, i.e. greater than 10 kilovolts (kV), either positive or negative, can cause defects in the coating operation during the production of a finished disc in the re-writeable format. In one aspect, the average static charge of a molded article comprising the triacylglyceride release agent and the monoacylglyceride release agent can be improved, i.e. can be closer to 0 kV (e.g., to neutral), as compared to the average static charge of a molded disc that is free of the triacylglyceride release agent and the monoacylglyceride release agent. In comparing the static charges, samples (e.g., discs) should be formed under the same molding conditions and using the same equipment, and then the static charge should be determined under same conditions (i.e. at the same time after molding, temperature, and probe distance). For example, the static charge for each disc can be determined under ambient conditions, 15 seconds after molding, with a probe distance of 4 cm.

The average static charge can be determined by measuring the static charge of discs as they are produced and plotting the static charge as a function of the disc number, and determining when the plot data has leveled out, e.g., is essentially horizontal such that the data is within a standard deviation. For example, referring to FIG. 4, lines 5, 6, 7, 8, 9, and 10, level out after 1009 shots (aka discs). Therefore, the average static charge is determined after the 1009 shots. For example, the average static charge can be determined by averaging the static charge of discs 1500 to 2000, for each disc composition. Hence, the average static charge of a molded disc comprising the present thermoplastic composition can be −13 kV to 0 kV, specifically, −7 to 0 kV, more specifically, −4 to 0 kV, still more specifically, −3 to 0 kV, still more specifically, −2 to 0 kV. Dry static charge refers to samples tested that contain less than or equal to 200 ppm of water.

The thermoplastic composition can be processed with the optional properties of the fatty acids with respect to flow, impact properties, visual aesthetics and colorability of the polycarbonate polymer.

GTS can allow the preparation of thermoplastic compositions with very low friction coefficient and lowered yellowing index while allowing sufficient flow for injection molding of relatively large parts (which is difficult with pure polycarbonate resins) and retaining practical impact.

Conventional thermoplastic compositions comprising polycarbonate are susceptible to color degradation over time. The parameters dYi (or dE) are commonly used parameters to measure color stability. These parameters also show the thermoplastic composition's heat aging stability. These parameters are typically evaluated using the thermoplastic composition at 120° C. for 5,000 hours. For this test, the yellowing indicates a worsening of the aging performance. In one aspect, the color stability of the thermoplastic composition shows a lower yellowness index (Yi) than the reference thermoplastic composition without a release agent. In another aspect, the Yi of the thermoplastic composition is less than 10, specifically, less than or equal to 5.

The thermoplastic composition can have light transparency of greater than 90% as determined using a wavelength of 2.54 nanometers in accordance with ASTM D1003.

Method

A method for making a thermoplastic composition can comprise:
 (1) forming a blend composition comprising:
  a. a polycarbonate polymer;
  b. a triacylglyceride release agent; and
  c, a monoacylglyceride release agent; and
 (2) extruding the blend composition.

The triacylglyceride release agent can comprise glycerol tristearate. The monoacylglyceride release agent can comprise glycerol monostearate.

The monoacylglyceride release agent can be present in an amount in of 0.01 weight percent to 0.5 weight percent relative to the total weight of the thermoplastic composition. The monoacylglyceride release agent can be present in an amount in the range of 0.01 weight percent to 0.2 weight percent relative to the total weight of the thermoplastic composition. The triacylglyceride release agent can be present in an amount in the range of 0.01 weight percent to 1 weight percent relative to the total weight of the thermoplastic composition and the monoacylglyceride release agent is present in an amount in the range of 0.01 weight percent to 0.5 weight percent relative to the total weight of the thermoplastic composition. The triacylglyceride release agent can be present in an amount in the range of 0.01 weight percent to 3 weight percent relative to the total weight of the thermoplastic composition and the monoacylglyceride release agent is present in an amount in the range of 0.01 weight percent to 0.2 weight percent relative to the total weight of the thermoplastic composition.

The method can comprise forming a molded article from the formed blend composition. The molded article can exhibit lower release forces during demolding of the parts than that exhibited by a molded article formed from an identical reference composition in the absence of the glycerol tristearate release agent. The molded article can exhibit fewer aesthetic defects on the surface of the molded part than that exhibited by a molded article formed from an identical reference composition in the absence of the glycerol tristearate release agent.

The method can comprise adding several additives to ensure a correct set of properties to the final product. The several additives can be combined in an additives package or added separately. The additives, for example, can include a third release agent, a heat stabilizer, a catalyst quencher, a tint, or a combination comprising at least one of the foregoing. For example, the additives package can be added into the finishing extruder as a solid masterbatch. In another aspect, the additives can be fed to establish a correlation between the additive and the vibration. For example, several release agents and/or UV stabilizers have been fed to establish a correlation between release agent and vibrations.

In a further aspect, for extrusion, the polymer has an endcap level [ratio of phenol endgroups to total endgroup amount in % (OH+Phenol)] higher than 50%. In another aspect, for extrusion the polymer has an endcap level [ratio of phenol endgroups to total endgroup amount in % (OH+Phenol)] higher than 65%, specifically, greater than 80%, more specifically, 80 to 95%.

Articles

In one aspect, the article is a media storage device. In a further aspect, the article is an optical media storage device. In another aspect, the media storage device comprises CD (e.g., compact disc-readable (CD-ROM) compact disc-writable (CD-R), compact disc-rewritable (CD-RW)), digital versatile disc (e.g., digital versatile disc-readable (DVD-ROM), digital versatile disc-writable (DVD-R), digital versatile disc-rewritable (DVD-RW)), Blu-ray Discs (e.g., Blu-ray Disc readable (only) (BD-ROM) Blu-ray Disc writable (BD-R), and Blu-ray Disc-rewritable (BD-RW)). In another aspect, the media storage device may comprise an article comprising an electrical part, electronic application part, medical device part, electrical connector part, enclosure for electrical equipment, electric motor part, power distribution equipment part, communication equipment part, or computer part. In another aspect, the article can be an optical device such as a lens.

In one aspect, the molded article has a thickness of 1.2 mm to 2.0 mm. For example, the molded article has a thickness of 1.6 mm. In another aspect, the molded article has a thickness of 2.8 to 3.5 mm. For example, the molded article has a thickness of 3.2 mm.

EXAMPLES

The following examples are put forth so as to provide those of ordinary skill in the art with a complete disclosure and description of how the compositions disclosed and claimed herein can be made and evaluated, and are intended to be purely exemplary and are not intended to limit the disclosure. Unless indicated otherwise, parts are parts by weight, temperature is in ° C. or is at ambient temperature, and pressure is at or near atmospheric.

In the following examples, thermoplastic compositions of the present disclosure were manufactured and tested. The thermoplastic composition includes polycarbonate OQ1028 grade; 2 ppm of phosphorous acid, where included; 100 ppm of demineralized water; 100 ppm of Irgafos; and 8 ppm of butyl tosylate. The polycarbonate OQ1028 grade is a polycarbonate available from SABIC's Innovative Plastics business.

The thermoplastic compositions comprising GMS were produced in the main plant and/or in the pilot plant. The thermoplastic composition comprising GTS was produced in the pilot plant.

The plate-out was determined by determining a stamper weight after 8000 shots, cleaning the stamper, and washing the deposit from the stamper surface. After cleaning, the stamper weight was again determined and the plate-out or the weight of the deposit was equal to the weight before cleaning minus the weight after cleaning.

The static charge was determined by placing a molded disc in a cooling unit and fixing a static charge measuring device 4 cm from the surface of the disc. The static charge of each disc was measured 15 seconds after molding. The static charge data in the figures has been averaged, where each data point is an averaged data point of the 10 measured data points that were measured after that data point.

"Dry" data was determined using a dry sample, where the disc contains less than or equal to 200 ppm of water.

Examples 1-3

Comparison of GMS and GTS as a Release Agent

The formulations of Examples 1-3 are shown in Table 1. The resulting compositions were tested for static charge (FIGS. 1-3 for Examples 1-3, respectively) and plate-out (see Table 1). In Table 1, the numbers under the GMS and GTS indicate the ppm level formulated/measured and the average (ave.) static charge is determined by averaging the static charge of the last 200 molded discs.

TABLE 1

| Example | GMS (ppm) | GTS (ppm) | Phosphorus acid (ppm) | Plate-Out (mg) (dry) | Ave. Static Charge (dry) |
|---|---|---|---|---|---|
| 1 | — | 360/250 | 0 | 0.91 | 8.7 |
| 2 | 360/350 | — | 2 | 4.6 | −11.8 |
| 3 | 360/340 | — | 0 | 4.5 | −14.7 |

Figure 1:
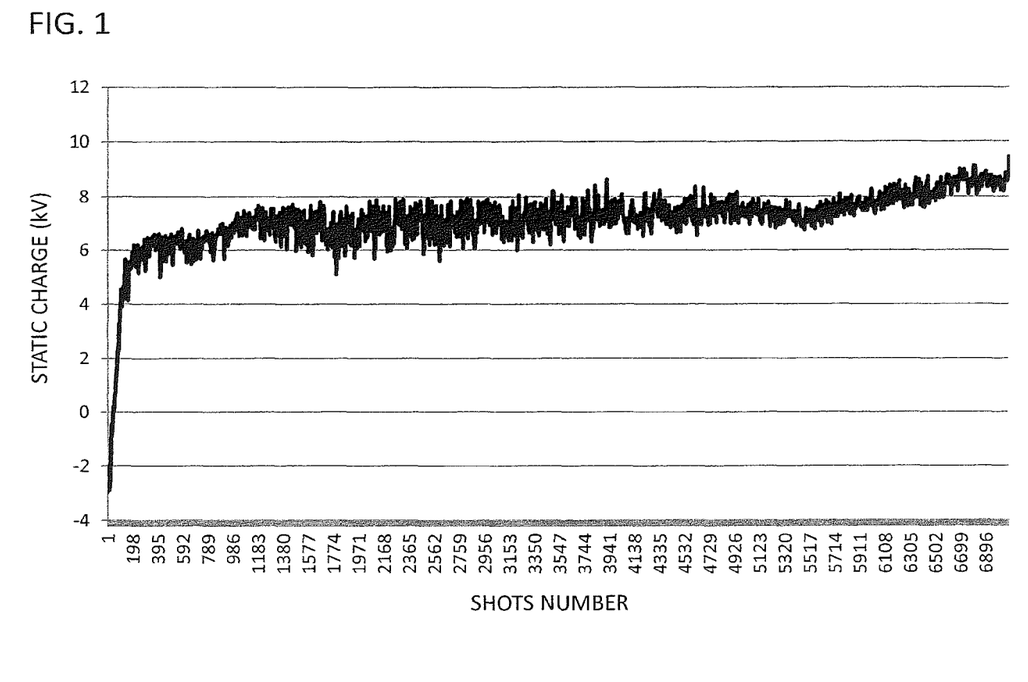
FIG. 1 is a graphical illustration of the static charge for Example 1.
Figure 2:
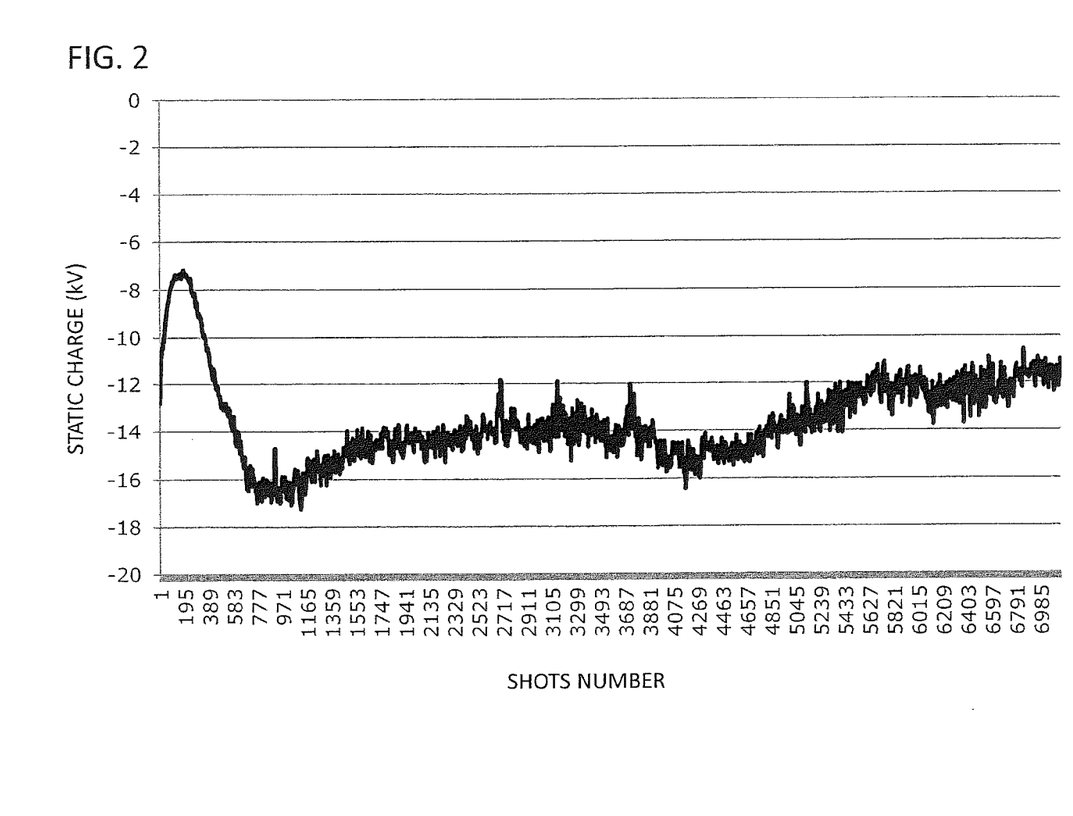
FIG. 2 is a graphical illustration of the dry static charge for Example 2.
Figure 3:
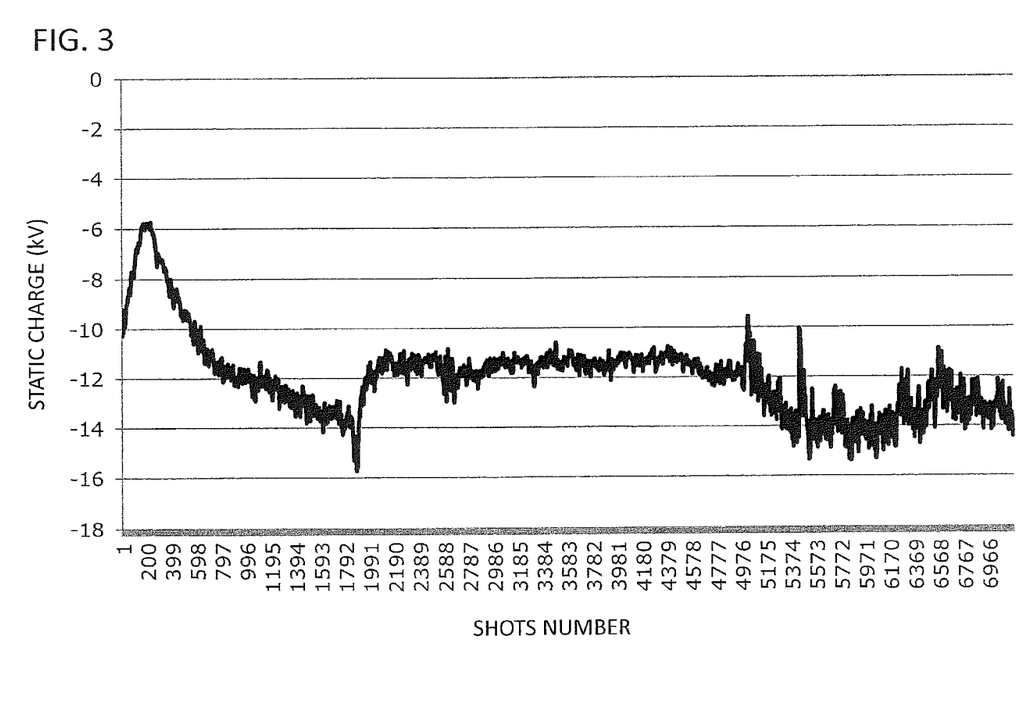
FIG. 3 is a graphical illustration of the dry static charge for Example 3.

Example 1, comprising GTS, has a positive average static charge on the surface, whereas Examples 2 and 3, comprising GMS, have negative average static charges, see FIGS. 1-3, respectively. Also, Table 1 shows there was a significant reduction in dry plate-out by using GTS.

Examples 4-15

Effect of GMS and GTS on the Average Static Charge

Example 4 is a commercial polycarbonate composition comprising an interfacial polycarbonate and GMS. The static charge of the sample was determined and is shown in FIG. 3 as the data curve with the positive average static charge. This sample has a positive static charge due to the interfacial polycarbonate.

The formulations of Examples 5-15 are shown in Table 2. The resulting compositions were tested for static charge (see FIGS. 4 and 5), where the average static charge is determined by averaging the static charge of the last 200 molded discs.

TABLE 2

| Example | GMS (ppm) | GTS (ppm) | Ave. Static Charge (dry) |
|---|---|---|---|
| 5 | 180 | 180 | −7.8 |
| 6 | 240 | 120 | −5.4 |
| 7 | 120 | 240 | −9.5 |
| 8 | 0 | 500 | −5.8 |
| 9 | 0 | 0 | −13.9 |
| 10 | 360 | 0 | −15.4 |
| 11 | 50 | 200 | −6 |
| 12 | 100 | 333 | −2.3 |
| 13 | 100 | 200 | −2.1 |
| 14 | 345 | 0 | −10.6 |
| 15 | 0 | 0 | −7.9 |

Figure 4:
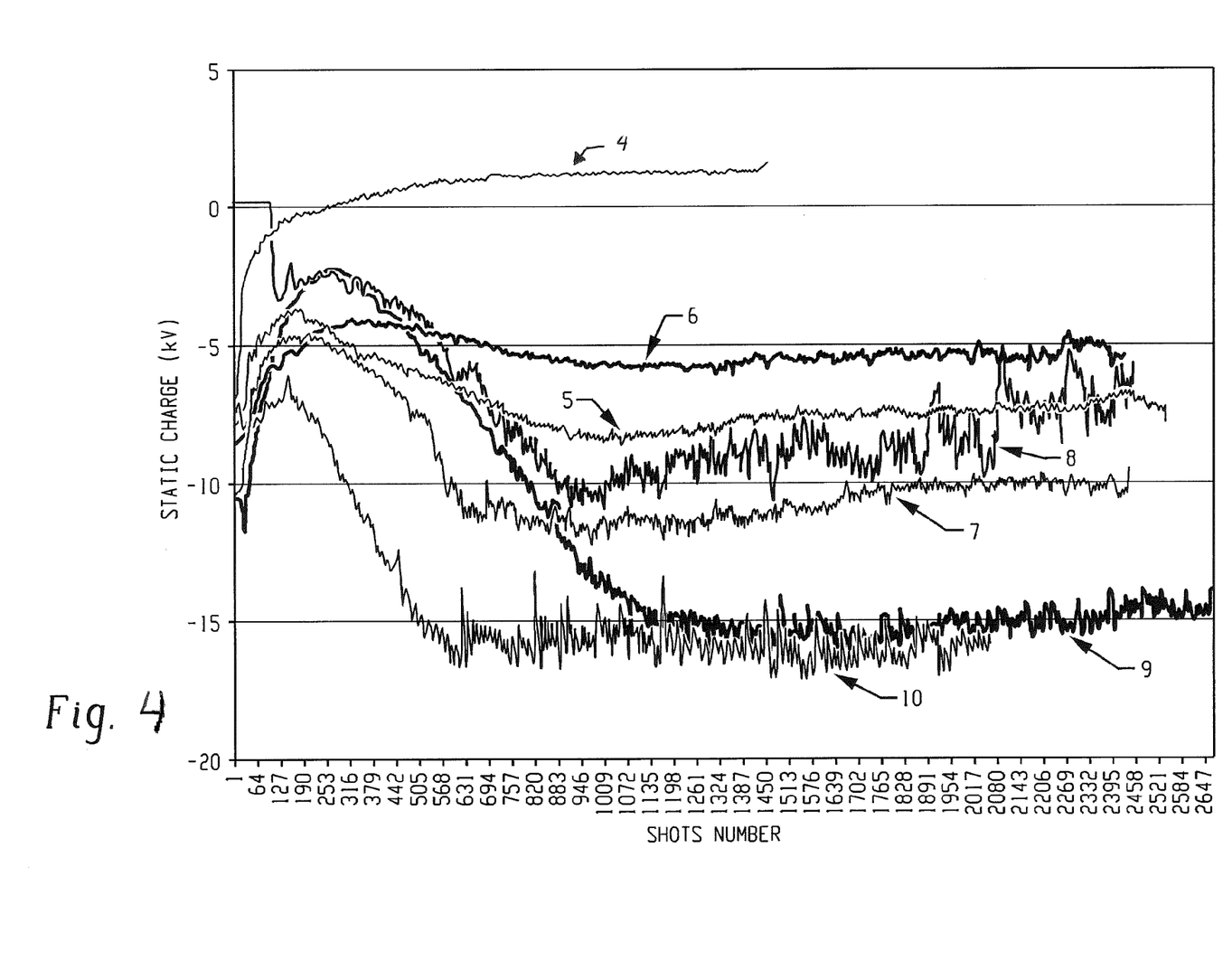
FIG. 4 is a graphical illustration of the dry static charge for Examples 4-10.
Figure 5:
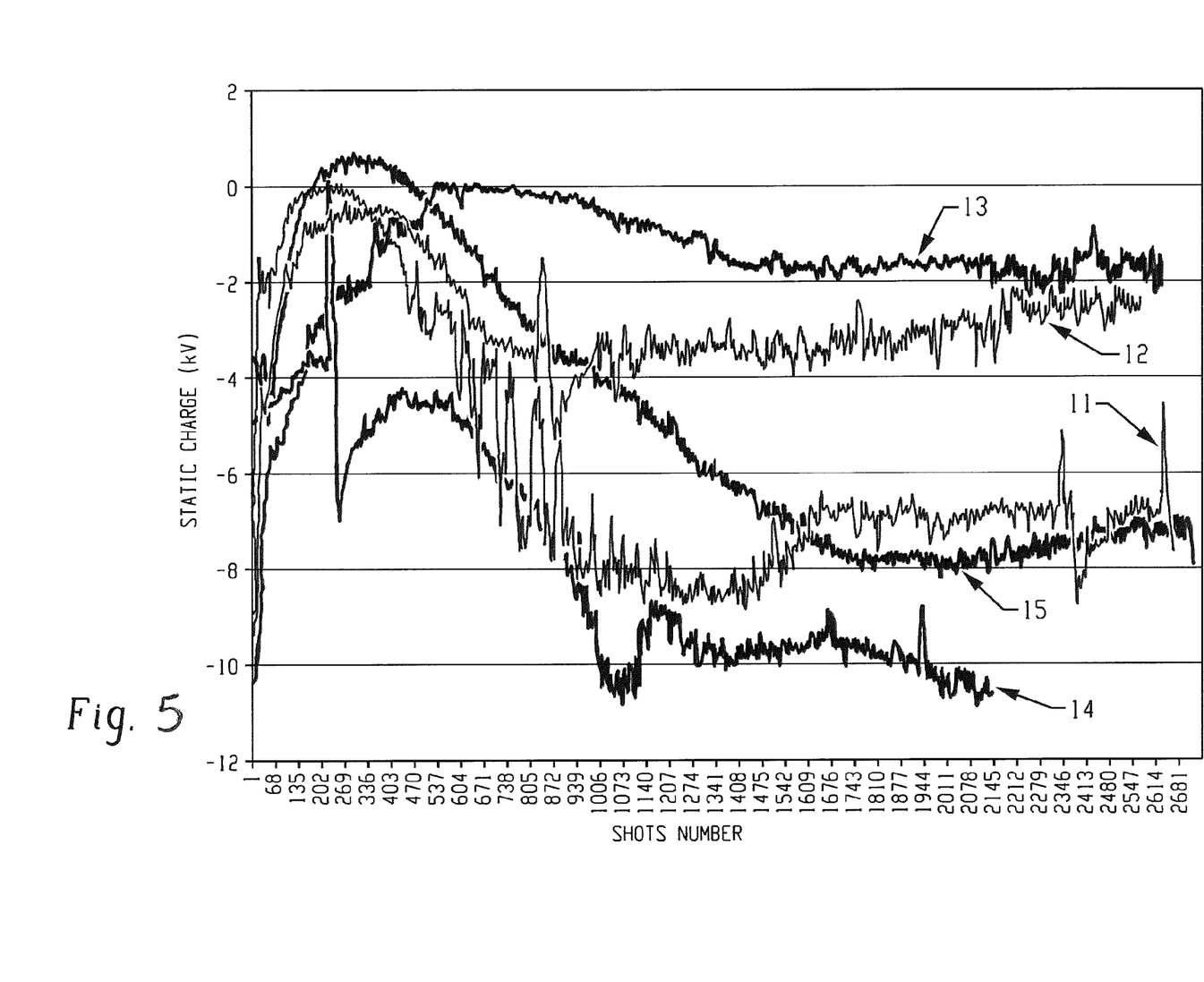
FIG. 5 is a graphical illustration of the dry static charge for Examples 11-15.

FIGS. 4 and 5 and Table 2 shows that the compositions of Examples 9 and 15 that do not comprise GMS or GTS have low average static charge values of −13.9 and −7.9, respectively. It is noted the average static charge for these two examples is not the same as it is difficult to control the average static charge in compositions without GMS and GTS, where variations in, for example processing steps, can result in different average static charges. FIGS. 4 and 5 show that by varying the amount of GTS and GMS in the composition, the resultant static charge can be varied. For example, as show in FIG. 5 with Examples 12 and 13, it is possible to produce polycarbonate grades with certain proportions of GMS and GTS to obtain a static charge close to neutral (0 to −3 kV). It is noted that the average static charge can be controlled by modifying the amount of GMS and/or GTS in the composition. For example, Example 7 comprises 120 ppm of GMS and 240 ppm of GTS and Example 13 comprises 100 ppm of GMS and 200 ppm of GTS and result in an average static charge of −5.4 and −2.1, respectively.

Set forth below are some embodiments of the present catalyst, and methods of making and using the catalyst.

Embodiment 1: a thermoplastic composition, comprising: greater than 90 weight percent based on the total weight of the composition of a melt polycarbonate polymer; a triacylglyceride release agent; and a monoacylglyceride release agent. The total amount of triacylglyceride release agent and the monoacylglyceride release agent is 0.01 to 0.5 weight percent based on the total weight of the composition.

Embodiment 2: the composition of Embodiment 1, wherein the total amount of triacylglyceride release agent and the monoacylglyceride release agent is 0.01 to 0.2 weight percent based on the total weight of the composition.

Embodiment 3: the composition of any of Embodiments 1-2, wherein the triacylglyceride release agent comprises glycerol tristearate.

Embodiment 4: the composition of any of Embodiments 1-3, wherein the monoacylglyceride release agent comprises glycerol monostearate.

Embodiment 5: the composition of any of Embodiments 1 and 3-4, wherein the triacylglyceride release agent is present in an amount in the range of from 0.01 weight percent to 0.4 weight percent relative to the total weight of the composition.

Embodiment 6: the composition of any of Embodiments 1 and 3-5, wherein the monoacylglyceride release agent is present in an amount in the range of from 0.01 weight percent to 0.4 weight percent relative to the total weight of the composition.

Embodiment 7: the composition of any of Embodiments 1-6, wherein a ratio of the triacylglyceride release agent to the monoacylglyceride release agent is 1:1 to 1:4.

Embodiment 8: the composition of Embodiments 7, wherein the ratio of a triacylglyceride release agent to the monoacylglyceride release agent is 1:1.5 to 1:3.5.

Embodiment 9: the composition of any of Embodiments 1-8, wherein the triacylglyceride release agent and the monoacylglyceride release agent are the only two release agents.

Embodiment 10: the composition of Embodiments 1-9, wherein the polycarbonate has a PDI of 1.9 to 2.6.

Embodiment 11: the composition of Embodiments 1-10, wherein the polycarbonate has a branching less than 2,000 ppm.

Embodiment 12: the composition of any of Embodiments 1-11, wherein the polycarbonate has branching from the structures below of less than 2,000 ppm Embodiment 13: a method for making a thermoplastic composition; comprising forming the composition of any of Embodiments 1-12, wherein the composition is a blend composition; and extruding the composition.

Embodiment 14: the method of Embodiment 13, further comprising forming an article from the composition.

Embodiment 15: an article of manufacture formed from the composition of any of Embodiments 1-12.

Embodiment 16: the article of Embodiment 15, wherein the article is an injection molded part.

Embodiment 17: the article of any of Embodiments 15-16, wherein the article is a media storage device.

Embodiment 18: the article of Embodiment 17, wherein the media storage device comprises CD-R, CD-RW, DVD-R, DVD-RW, BD-R, or BD-RW.

Embodiment 19: the article of any of Embodiments 16-18, wherein the article exhibits a reduction in deposits compared to that exhibited by an article formed from an identical reference composition in the absence of the triacylglyceride release agent.

Embodiment 20: the article of Embodiment 19, wherein the reduction in deposits comprises a decreased plate-out.

Embodiment 21: the article of Embodiment 20, wherein the plate-out is 2.5 mg to 6.0 mg.

Embodiment 22: the article of any of Embodiments 15-21, wherein the article has an article average static charge closer to 0 kV as compared to a comparative average static charge of a molded article that is the same composition except it is free of the triacylglyceride release agent and the monoacylglyceride release agent.

Embodiment 23: the article of Embodiment 22, wherein the article average static charge is −7 to 0 kV as determined by averaging the static charge of the 1500th to 2500th articles formed.

Embodiment 24: the article of any of Embodiments 15-21, wherein the article has an article average static charge of −7 to 0 kV as determined by averaging the static charge of the 1500th to 2500th articles formed.

Embodiment 25: the article of any of Embodiments 22-24, wherein the article average static charge is −5 to 0 kV.

Embodiment 26: the article of any of Embodiments 22-25, wherein the article average static charge is −3 to 0 kV.

Embodiment 27: the article of any of Embodiments 22-26, wherein the article average static charge is −2 to 0 kV.

Embodiment 28: the composition of any of Embodiments 1-12, wherein the composition has a light transparency of greater than 90% as determined using a wavelength of 2.54 nanometers in accordance with ASTM D1003.

What is claimed is:

1. An article formed from a composition, wherein the composition comprises:
   glycerol tristearate, glycerol monostearate, and greater than 90 weight percent based on the total weight of the composition of a melt polycarbonate polymer, wherein the melt polycarbonate polymer is made by a melt polymerization process;

wherein a total amount of glycerol tristearate and the glycerol monostearate is 0.01 to 0.1 weight percent based on a total weight of the composition; wherein a ratio of the glycerol monostearate to the glycerol tristearate is 1:1.5 to 1:3.5; and wherein the article has an article average static charge of −3 to 0 kV as determined by averaging the static charge of a 1500th to a 2500th article formed.

2. The article of claim 1, wherein the glycerol tristearate is present in an amount of 0.01 to 0.05 weight percent relative to the total weight of the composition.

3. The article of claim 1, wherein the ratio is 1:2 to 1:3.3.

4. The article of claim 1, wherein the glycerol tristearate and the glycerol monostearate are the only two release agents.

5. The article of claim 1, wherein the polycarbonate has a PDI of 1.9 to 2.6.

6. The article of claim 1, wherein the polycarbonate includes branching structures, wherein the branching structures are present in an amount of greater than 0 to less than 2,000 ppm.

7. The article of claim 1, wherein the article is an injection molded part.

8. The article of claim 1, wherein the article is a media storage device.

9. The article of claim 8, wherein the media storage device comprises CD-R, CD-RW, DVD-R, DVD-RW, BD-R, or BD-RW.

10. The article of claim 1, wherein the article exhibits a reduction in deposits compared to that exhibited by an article formed from an identical reference composition in the absence of the glycerol tristearate.

11. The article of claim 10, wherein the reduction in deposits comprises a decreased plate-out.

12. The article of claim 11, wherein the plate-out is 2.5 mg to 6.0 mg.

13. A method for making an article; comprising
forming a composition;
extruding the composition to form an extruded composition; and
forming the article from the extruded composition;
wherein the composition comprises glycerol tristearate, glycerol monostearate, and greater than 90 weight percent based on the total weight of the composition of a melt polycarbonate polymer, wherein the melt polycarbonate polymer is made by a melt polymerization process;
wherein a total amount of the glycerol tristearate and the glycerol monostearate is 0.01 to 0.1 weight percent based on the total weight of the composition; wherein a ratio of the glycerol monostearate to the glycerol tristearate is 1:1.5 to 1:3.5; and
wherein the article has an article average static charge of −3 to 0 kV as determined by averaging the static charge of a 1500th to a 2500th article formed.

* * * * *